(12) United States Patent
Miyachi et al.

(10) Patent No.: US 6,930,750 B2
(45) Date of Patent: Aug. 16, 2005

(54) LIQUID CRYSTAL OPTICAL ELEMENT AND THREE-DIMENSIONAL DISPLAY SYSTEM INCLUDING THE LIQUID CRYSTAL OPTICAL ELEMENT

(75) Inventors: Koichi Miyachi, Soraku-gun (JP); Seiji Shibahara, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 92 days.

(21) Appl. No.: 10/688,948

(22) Filed: Oct. 21, 2003

(65) Prior Publication Data

US 2004/0085507 A1 May 6, 2004

(30) Foreign Application Priority Data

Oct. 22, 2002 (JP) ....................................... 2002-306944

(51) Int. Cl.$^7$ ............................................. G02F 1/1335
(52) U.S. Cl. ...................... 349/201; 349/174; 349/15; 349/165
(58) Field of Search .......................... 349/201, 15, 174, 349/165

(56) References Cited

U.S. PATENT DOCUMENTS

| | | | |
|---|---|---|---|
| 4,668,051 A | * | 5/1987 | Mourey et al. ............... 349/34 |
| 5,552,916 A | * | 9/1996 | O'Callaghan et al. ....... 349/201 |
| 5,729,307 A | | 3/1998 | Koden et al. |
| 5,986,740 A | * | 11/1999 | Robinson et al. ........... 349/201 |
| 5,989,451 A | * | 11/1999 | Lemieux et al. .......... 252/299.1 |
| 6,243,063 B1 | * | 6/2001 | Mayhew et al. ............... 345/94 |
| 6,864,931 B1 | * | 3/2005 | Kumar et al. .................. 349/88 |

FOREIGN PATENT DOCUMENTS

| | | |
|---|---|---|
| JP | 4-122913 | 4/1992 |
| WO | WO 88008552 A1 * | 11/1988 |

OTHER PUBLICATIONS

"Nonlineear spatial filtering with a dye doped liquid crystal cell", Kato et al, Opticls letters vol. 21, No 11, Jun. 1, 1996.*

A. Fukuda, "Pretransitional Effect in AF–F Switching: To Suppress It or to Enhance It, That is My Question about AFLCD's", ASIA Display '95, pp. 61–64, cited in [0088], p. 37 of the specification.

Y. Yamada et al., "A Full–Color Video–Rate Anti–Ferroelectric LCD with Wide Viewing Angle", SID 95 Digest pp. 789–792, cited in [0008], p. 3 of the specification.

K. D'Have et al., "Antiferroelectric Liquid Crystals with 45° Tilt–A–New Class of Promising Electro–Optic Materials", Ferroelectrics, vol. 244, pp 115–128, cited in [0101], p. 43 of the specification.

\* cited by examiner

*Primary Examiner*—Kenneth Parker
(74) *Attorney, Agent, or Firm*—Nixon & Vanderhye, P.C.

(57) ABSTRACT

A liquid crystal optical element includes two substrates, a liquid crystal layer, and at least two electrodes. The liquid crystal layer is provided between the substrates and includes liquid crystal molecules and dichroic dye molecules. The at least two electrodes are provided on the substrates so as to face each other with the liquid crystal layer interposed between them, and define one of multiple unit regions. In each unit region, the liquid crystal layer includes first and second liquid crystal regions within a range, which is approximately half or less as long as the wavelength of visible radiation as measured in a direction parallel to the surfaces of the substrates. The orientation directions of each pair of liquid crystal molecules in the first and second liquid crystal regions have azimuthal directions defining an angle of approximately 90 degrees while no voltage is being applied between the electrodes.

16 Claims, 9 Drawing Sheets

FIG.5

| WT% | STRUCTURAL FORMULA |
|---|---|
| 6.31 | $F_3C(CH_2)_2COO(CH_2)_3O$—⟨phenyl⟩—⟨phenyl⟩—COO—⟨phenyl⟩—$COOC^*(CH_3)HC_6H_{13}$ |
| 20.77 | $F_7C_3COO(CH_2)_3O$—⟨phenyl⟩—⟨phenyl⟩—COO—⟨phenyl⟩—$COOC^*(CH_3)HC_6H_{13}$ |
| 32.45 | $F_{15}C_7COO(CH_2)_3O$—⟨phenyl⟩—⟨phenyl⟩—COO—⟨phenyl⟩—$COOC^*(CH_3)HC_6H_{13}$ |
| 40.47 | $F_7C_3COO(CH_2)_4O$—⟨phenyl⟩—⟨phenyl⟩—COO—⟨phenyl⟩—$COOC^*(CH_3)HC_6H_{13}$ |

FIG.7A FIG.7B FIG.7C

LIQUID CRYSTAL OPTICAL ELEMENT AND THREE-DIMENSIONAL DISPLAY SYSTEM INCLUDING THE LIQUID CRYSTAL OPTICAL ELEMENT

BACKGROUND OF THE INVENTION

1. Field of the Invention

The present invention generally relates to a liquid crystal optical element and a three-dimensional display system including the liquid crystal optical element. More particularly, the present invention relates to a liquid crystal optical element with no polarizers and a three-dimensional display system including such a liquid crystal optical element.

2. Description of the Related Art

Liquid crystal displays (LCDs) are relatively thin display devices with comparatively low power dissipation. By taking advantage of these features, LCDs are currently used extensively in a broad variety of applications including office automation (OA) appliances such as word processors and personal computers, mobile telecommunications units such as personal digital assistants, and camcorders with a liquid crystal monitor.

Most of the LCDs currently used normally include a nematic liquid crystal layer. However, since a nematic liquid crystal material has a relatively low response speed, the conventional LCDs are inferior in moving picture display capability than CRTs.

This is why a smectic liquid crystal material with a high response speed has recently been adopted more and more often as an alternative material to the nematic liquid crystal material with a relatively low response speed. Among other things, smectic liquid crystal materials, exhibiting ferroelectricity or antiferroelectricity, show spontaneous polarization, and respond to an applied electric field due to interactions between the spontaneous polarization and the electric field. Thus, the smectic liquid crystal materials can respond as quickly as within about 1 ms.

Examples of optical elements using ferroelectric liquid crystal materials include a surface-stabilized ferroelectric liquid crystal (SSFLC) optical element. The SSFLC optical element is characterized by exhibiting bistability with respect to an applied electric field and switching between the two stabilized states as quickly as within about 1 ms.

However, the electrooptical response of the SSFLC optical elements exhibiting the bistability is limited to switching between bright and dark states. Accordingly, it is difficult for such optical elements to display grey-scale tones by controlling the applied voltages.

In contrast, an antiferroelectric liquid crystal material is characterized by exhibiting tristability, which is achieved by electric field induced phase transition between an antiferroelectric phase with no electric field applied and a ferroelectric phase with an electric field applied, and switching between two of the three stabilized states as quickly as the SSFLC optical elements (i.e., within about 1 ms).

The antiferroelectric liquid crystal material can contribute to driving an LCD by a simple matrix addressing technique when allowed to switch with a biased electric field applied. In addition, the antiferroelectric liquid crystal material can also contribute to displaying grey-scale tones by the simple matrix addressing technique if its state in which the antiferroelectric and ferroelectric phases coexist is controlled through applied voltages. For example, Y. Yamada et al., "A Full-Color Video-Rate Antiferroelectric LCD with Wide Viewing Angle", SID '95 Digest, pp. 789–792, discloses a 6-inch liquid crystal optical element which can conduct a display operation in full colors with such an antiferroelectric liquid crystal material used in a simple matrix addressing mode.

A liquid crystal optical element that needs no polarizers by using such an antiferroelectric liquid crystal material was proposed. Generally speaking, polarizers are expensive optical members. Accordingly, when no polarizers are needed, the manufacturing cost of liquid crystal optical elements can be cut down. In addition, the decrease in yield, which would otherwise be caused by the foreign matter entering the LCD while the polarizers are being bonded, can be substantially eliminated.

For example, Japanese Laid-Open Publication No. 8-122830 discloses a liquid crystal optical element including two liquid crystal cells, in each of which an antiferroelectric smectic liquid crystal material with a dichroic dye is enclosed hermetically, and having no polarizers. FIGS. 8 and 9 schematically illustrate the liquid crystal optical element 500 disclosed in Japanese Laid-Open Publication No. 8-122830.

As shown in FIG. 8, the liquid crystal optical element 500 is obtained by stacking a liquid crystal cell 500a on another liquid crystal cell 500b.

Each of these two liquid crystal cells 500a and 500b includes two substrates 510 and 520, an antiferroelectric smectic liquid crystal layer 530 provided between the substrates 510 and 520, and two electrodes 512 and 522 provided between the substrates 510, 520 and the liquid crystal layer 530. Although not shown in FIG. 8, an alignment film is provided on each of these electrodes 512 and 522.

As shown in FIG. 9, each of the two liquid crystal layers 530 includes liquid crystal molecules 531 and dichroic dye molecules 532, absorbs an incoming polarized light ray of which the plane of polarization is parallel to the absorption axis thereof, and transmits an incoming polarized light ray of which the plane of polarization is parallel to the transmission axis thereof. Also, the liquid crystal cells 500a and 500b are arranged such that a normal defined perpendicularly to the smectic layers 534 of the liquid crystal layer 530 in the liquid crystal cell 500a and a normal defined perpendicularly to those of the liquid crystal layer 530 in the other liquid crystal cell 500b cross each other at right angles.

While no voltage is being applied to the liquid crystal layers 530, the absorption axes of the liquid crystal layers 530 of the liquid crystal cells 500a and 500b cross each other at right angles, thus realizing a dark-state display.

On the other hand, when a predetermined voltage is applied to the liquid crystal layers 530, the absorption axes of the liquid crystal layers 530 of the liquid crystal cells 500a and 500b no longer cross each other at right angles, thus realizing a bright-state display.

Japanese Laid-Open Publication No. 4-122913 discloses a guest host liquid crystal optical element in which two antiferroelectric smectic liquid crystal layers, each including a dichroic dye, are stacked one upon the other such that a normal defined perpendicularly to the smectic layers of one of the liquid crystal layers is parallel to a normal defined perpendicularly to those of the other liquid crystal layer and that the direction to which liquid crystal molecules tilt in response to an electric field applied to one of the two liquid crystal layers is opposite to the direction to which liquid crystal molecules tilt responsive to the electric field applied to the other liquid crystal layer. As opposed to the liquid crystal optical element 500 disclosed in Japanese Laid-Open Publication No. 8-122830, the liquid crystal optical element disclosed in Japanese Laid-Open Publication No. 4-122913 realizes a bright-state display with no voltage applied and a dark-state display with a voltage applied, respectively.

However, the liquid crystal optical element 500 disclosed in Japanese Laid-Open Publication No. 8-122830 uses two liquid crystal cells, thus requiring twice as high a manufacturing cost as the conventional LCD with a single liquid crystal cell.

Japanese Laid-Open Publication No. 4-122913 also discloses an arrangement in which two liquid crystal cells are used to stack two liquid crystal layers one upon the other, thus doubling the manufacturing cost as well as the liquid crystal optical element disclosed in Japanese Laid-Open Publication No. 8-122830.

It should be noted that Japanese Laid-Open Publication No. 4-122913 also discloses an arrangement in which two liquid crystal layers are stacked one upon the other between one pair of substrates. However, a liquid crystal optical element with such a structure cannot be obtained by a normal process step of injecting a liquid crystal material into a predetermined gap between two substrates that have been bonded together. Instead, such a structure may be formed by performing the process step of stacking two filmed liquid crystal layers one upon the other. However, a complicated material processing technique is required to transform an antiferroelectric liquid crystal material into a film shape. Also, to make the filmed liquid crystal layers, a polymer liquid crystal material needs to be used or a network of a polymer material needs to be created in the liquid crystal layers. In that case, the response of the liquid crystal material to the applied voltage will decrease significantly.

Thus, the liquid crystal optical elements that need no polarizers as disclosed in Japanese Laid-Open Publications No. 8-122830 and No. 4-122913 cannot achieve sufficiently high productivity or sufficiently good performance.

SUMMARY OF THE INVENTION

In order to overcome the problems described above, preferred embodiments of the present invention provide a liquid crystal optical element, which achieves sufficiently high productivity and sufficiently good performance without using any polarizer, and a three-dimensional display system including such a liquid crystal optical element.

A liquid crystal optical element according to a preferred embodiment of the present invention preferably includes two substrates, a liquid crystal layer, and at least two electrodes. The liquid crystal layer is preferably provided between the two substrates and preferably includes liquid crystal molecules and dichroic dye molecules. The at least two electrodes are preferably provided on the two substrates, respectively, so as to face each other with the liquid crystal layer interposed between them, and preferably define one of a plurality of unit regions. In each of the unit regions, the liquid crystal layer preferably includes a first liquid crystal region and a second liquid crystal region within a range, which is approximately half or less as long as the wavelength of visible radiation as measured in a direction that is parallel to the surfaces of the two substrates. The orientation directions of each pair of liquid crystal molecules in the first and second liquid crystal regions preferably have azimuthal directions that define an angle of approximately 90 degrees while no voltage is being applied between the electrodes.

In one preferred embodiment of the present invention, the liquid crystal layer is preferably a smectic liquid crystal layer including a plurality of smectic layers, and the liquid crystal molecules preferably define a tilt angle of about 45 degrees with respect to a normal that is defined perpendicularly to the smectic layers.

In this particular preferred embodiment, the smectic liquid crystal layer may exhibit an antiferroelectric phase.

In an alternative preferred embodiment, the smectic liquid crystal layer may exhibit a ferrielectric phase. In that case, while no voltage is being applied between the electrodes, the number of liquid crystal molecules tilting toward one direction from the normal that is defined perpendicularly to the smectic layers is preferably approximately equal to that of liquid crystal molecules tilting toward the opposite direction from the normal.

In another alternative preferred embodiment, the smectic liquid crystal layer may have a V-shaped switching characteristic.

In still another preferred embodiment, the liquid crystal molecules of the smectic liquid crystal layer preferably have a tilt angle of about 43.5 degrees to about 46.5 degrees.

In yet another preferred embodiment, the liquid crystal molecules of the smectic liquid crystal layer may have a tilt angle of about 40.3 degrees to about 49.7 degrees.

In yet another preferred embodiment, the liquid crystal molecules of the smectic liquid crystal layer may have a tilt angle of about 37.0 degrees to about 53.0 degrees.

In yet another preferred embodiment, the liquid crystal molecules of the smectic liquid crystal layer may have a tilt angle of about 32.7 degrees to about 57.4 degrees.

A three-dimensional display system according to a preferred embodiment of the present invention preferably includes the liquid crystal optical element according to any of preferred embodiments of the present invention described above. The unit regions of the liquid crystal optical element are preferably a plurality of picture element regions that are used to conduct a display operation in response to an image signal supplied. The three-dimensional display system preferably alternately displays a left-eye image component and a right-eye image component on each of the picture element regions, thereby presenting a three-dimensional image thereon. A voltage applied between the electrodes in supplying an image signal representing the left-eye image component to each of the picture element regions and a voltage applied between the electrodes in supplying an image signal representing the right-eye image component to the picture element region preferably have mutually opposite polarities.

Hereinafter, it will be described exactly how a liquid crystal optical element according to a preferred embodiment of the present invention works.

As described above, a liquid crystal optical element according to a preferred embodiment of the present invention preferably includes two substrates, a liquid crystal layer, which is provided between the two substrates and which includes liquid crystal molecules and dichroic dye molecules, and two electrodes, which are provided on the two substrates, respectively, so as to face each other with the liquid crystal layer interposed between them and which define a plurality of unit regions.

In each of those unit regions, the liquid crystal molecules of the liquid crystal layer change their orientation directions according to the magnitude of the voltage applied between the two electrodes. In this case, the dichroic dye molecules also change their orientation directions along with the liquid crystal molecules. More specifically, the dichroic dye molecules change their orientation directions so as to be aligned with the liquid crystal molecules. The absorption axis of the dichroic dye molecules is typically parallel to the orientation direction of the dichroic dye molecules (i.e., the major-axis direction), and changes as the dichroic dye molecules change their orientation directions. Accordingly, the absorption axis of the dichroic dye molecules included in the liquid crystal layer changes according to the magnitude of the voltage applied between the two electrodes, thus changing the quantity of light outgoing from each unit region.

In a liquid crystal optical element according to a preferred embodiment of the present invention, in each of the unit regions, the liquid crystal layer preferably includes a first liquid crystal region and a second liquid crystal region within a range, which is approximately half or less as long as (preferably about 200 nm or less) the wavelength of visible radiation (typically in the range of about 400 nm to about 700 nm) as measured in a direction that is parallel to the surfaces of the two substrates. The orientation directions of each pair of liquid crystal molecules in the first and second liquid crystal regions preferably have azimuthal directions that define an angle of approximately 90 degrees while no voltage is being applied between the electrodes. Since the orientation directions of each pair of liquid crystal molecules in the first and second liquid crystal regions have azimuthal directions that define an angle of approximately 90 degrees, those of each pair of dichroic dye molecules in the first and second liquid crystal regions also have azimuthal directions that define an angle of approximately 90 degrees. Accordingly, while no voltage is being applied between the electrodes, the absorption axes of each pair of dichroic dye molecules in the first and second liquid crystal regions (i.e., the absorption axes defined on a plane that is parallel to the surface of the substrates) cross each other substantially at right angles. Thus, in the liquid crystal optical element according to this preferred embodiment of the present invention, there are two regions, in which the absorption axes of two dichroic dye molecules cross each other at right angles, within a range that is about half or less as long as the wavelength of the visible radiation. Consequently, while no voltage is being applied, every component of the incident light on the liquid crystal layer is absorbed into the first and second liquid crystal regions, thus realizing a black display state. On the other hand, when a predetermined voltage is applied between the electrodes, the orientation state described above collapses and the light that has entered the liquid crystal layer is partially transmitted or reflected, thus realizing a white display state.

The liquid crystal optical element of this preferred embodiment of the present invention needs no polarizers, thus cutting down the manufacturing cost and minimizing the unwanted decrease in yield due to possible mixture of foreign matter during the process step of bonding the polarizers. In addition, the liquid crystal optical element of this preferred embodiment of the present invention does not need two liquid crystal cells, thus avoiding the increase in manufacturing cost due to the use of the additional liquid crystal cell. This is why the liquid crystal optical element of this preferred embodiment of the present invention ensures high productivity. Furthermore, in the liquid crystal optical element according to this preferred embodiment of the present invention, there is no need to stack two liquid crystal layers one upon the other or to transform those layers into films. Accordingly, the decrease in response speed that should be caused by the filmed liquid crystal layers is avoidable. Consequently, the liquid crystal optical element of this preferred embodiment of the present invention exhibits excellent performance.

The liquid crystal layer including the first and second liquid crystal regions described above may be a smectic liquid crystal layer, which consists of a plurality of smectic layers and in which liquid crystal molecules define a tilt angle of about 45 degrees with respect to a normal that is defined perpendicularly to the smectic layers. Supposing the first liquid crystal region is a region in which the liquid crystal molecules tilt toward a direction so as to define a tilt angle of about 45 degrees with respect to the normal to the smectic layers, the second liquid crystal region will be a region in which the liquid crystal molecules tilt toward the opposite direction so as to define the same tilt angle of about 45 degrees with respect to the normal to the smectic layers.

Examples of preferred smectic liquid crystal layers include smectic liquid crystal layers exhibiting an antiferroelectric phase and smectic liquid crystal layers exhibiting a ferrielectric phase.

In a smectic liquid crystal layer exhibiting the antiferroelectric phase, when liquid crystal molecules in one of the smectic layers tilt toward one direction from a normal that is defined perpendicularly to the smectic layers, liquid crystal molecules in its adjacent smectic layers tilt toward the opposite direction from the normal so as to cancel their polarizations with each other. That is to say, in such a smectic liquid crystal layer, a plurality of smectic layers, in which liquid crystal molecules have rotated approximately 45 degrees clockwise from the normal to the smectic layers, and a plurality of smectic layers, in which liquid crystal molecules have rotated approximately 45 degrees counterclockwise from the normal to the smectic layers, are stacked alternately. Accordingly, an orientation state, in which the first and second liquid crystal regions are alternately arranged along the normal to the smectic layers, is created. As a result, a black display state is realized by utilizing such a state. Also, when a voltage equal to or higher than the threshold voltage is applied to a liquid crystal layer exhibiting the antiferroelectric phase, the antiferroelectric phase switches into a ferroelectric phase in which the liquid crystal molecules tilt toward the same direction from the normal to the smectic layers. Thus, a white display state is realized by utilizing this state with the ferroelectric phase.

On the other hand, a smectic liquid crystal layer exhibiting the ferrielectric phase includes liquid crystal molecules tilting toward one direction from a normal that is defined perpendicularly to the smectic layers and liquid crystal molecules tilting toward the opposite direction from the normal. That is to say, such a smectic liquid crystal layer includes a plurality of smectic layers, in which liquid crystal molecules have rotated approximately 45 degrees clockwise from the normal to the smectic layers, and a plurality of smectic layers, in which liquid crystal molecules have rotated approximately 45 degrees counterclockwise from the normal to the smectic layers. In the ferrielectric phase, these two groups of smectic layers are stacked non-alternately. Accordingly, an orientation state, in which the first and second liquid crystal regions are arranged irregularly along the normal to the smectic layers, is created. As a result, a black display state is realized by utilizing such a state. To realize an even darker black display state by absorbing light more efficiently, the number (or the probability) of liquid crystal molecules tilting toward one direction is preferably approximately equal to that of liquid crystal molecules tilting toward the opposite direction. Also, when a voltage equal to or higher than the threshold voltage is applied to a liquid crystal layer exhibiting the ferrielectric phase, the ferrielectric phase switches into a ferroelectric phase in which the liquid crystal molecules tilt toward the same direction from the normal to the smectic layers. Thus, a white display state is realized by utilizing this state with the ferroelectric phase.

Alternatively, a smectic liquid crystal layer with a V-shaped switching characteristic may also be used. The smectic liquid crystal layer with the V-shaped switching characteristic shows a symmetric increase in transmittance in response to positive and negative voltages applied thereto. While no voltage is being applied to such a smectic liquid crystal layer, the probability of liquid crystal molecules tilting toward one direction from the normal to the smectic layers is approximately equal to that of liquid crystal molecules tilting toward the opposite direction. Thus, a black display state is realized. Also, when a voltage is applied thereto, a phase transition into the ferroelectric phase also occurs. Thus, a white display state is realized by utilizing this state with the ferroelectric phase.

If the liquid crystal molecules in the smectic liquid crystal layer define a tilt angle of about 45 degrees, then a (local) maximum contrast ratio is achieved and a display operation can be conducted in an excellent condition.

On the other hand, if the liquid crystal molecules in the smectic liquid crystal layer have a tilt angle of about 43.5 degrees to about 46.5 degrees, then the resultant contrast ratio will be at most 10% lower than the maximum contrast ratio for the tilt angle of about 45 degrees and a display operation can also be conducted in a sufficiently good condition.

Furthermore, if the liquid crystal molecules in the smectic liquid crystal layer have a tilt angle of about 40.3 degrees to about 49.7 degrees, then a contrast ratio of at least about 20 is achieved and a display operation can be conducted with almost no problems caused in practice.

Furthermore, if the liquid crystal molecules in the smectic liquid crystal layer have a tilt angle of about 37.0 degrees to about 53.0 degrees, then a contrast ratio of at least about 10, which is almost equal to that of reflective LCDs for use in currently available PDAs, for example, is achieved. Accordingly, a display operation can also be conducted effectively enough where the main application is inputting and outputting such character information.

Furthermore, if the liquid crystal molecules in the smectic liquid crystal layer have a tilt angle of about 32.7 degrees to about 57.4 degrees, then a contrast ratio of at least about 5, which is almost equal to that of newspapers and other normal prints, is achieved. Accordingly, a display operation can also be conducted effectively enough where the main application is presenting monochrome character information sources.

As described above, the closer to 45 degrees the tilt angle of the liquid crystal molecules, the higher the resultant contrast ratio. Meanwhile, the response characteristic improves as the tilt angle decreases. Thus, to improve the quality of moving pictures being displayed, the tilt angle is preferably as small as possible.

Optionally, the liquid crystal layer including the first and second liquid crystal regions may also be obtained by providing a first orientation control area and a second orientation control area on the respective inside surfaces of the substrates. In this case, the first orientation control area is preferably provided so as to get the liquid crystal molecules oriented in a first azimuthal direction, while the second orientation control area is preferably provided so as to get the liquid crystal molecules oriented in a second azimuthal direction, which defines an angle of about 90 degrees with the first azimuthal direction. Those first and second orientation control areas may be defined by a fine alignment treatment technique such as a photoalignment method. However, to make the liquid crystal optical element easily, the first and second liquid crystal regions are preferably defined by themselves as in the smectic liquid crystal layer described above.

A liquid crystal optical element according to a preferred embodiment of the present invention is preferably used in an LCD to present images, characters and so on thereon. In that case, multiple unit regions of the liquid crystal optical element function as multiple picture element regions to conduct a display operation in response to an image signal supplied.

Particularly when the liquid crystal optical element includes a smectic liquid crystal layer exhibiting an antiferroelectric phase, a smectic liquid crystal layer exhibiting a ferrielectric phase or a smectic liquid crystal layer with a V-shaped switching characteristic, the liquid crystal optical element can be used effectively in a three-dimensional display system for presenting a 3D image by alternately displaying a left-eye image component and a right-eye image component in each of the picture element regions.

When a voltage that is equal to or higher than the threshold voltage is applied to the smectic liquid crystal layer exhibiting the antiferroelectric phase, the smectic liquid crystal layer exhibiting the ferrielectric phase or the smectic liquid crystal layer with the V-shaped switching characteristic, a phase transition into the ferroelectric phase, in which the liquid crystal molecules tilt toward a single direction from a normal that is defined perpendicularly to the smectic layers, is induced by the applied voltage. The tilt direction reverses according to the polarity of the applied voltage (i.e., whether the applied voltage is positive or negative). Accordingly, the outgoing light ray of a liquid crystal layer, to which a positive voltage is being applied, and the outgoing light ray of a liquid crystal layer, to which a negative voltage is being applied, have mutually different polarization directions.

Thus, if a voltage with the opposite polarity is applied between the electrodes when an image signal representing the right-eye image component is supplied to each picture element region after an image signal representing the left-eye image component has been supplied thereto, then two light rays corresponding to the left-eye and right-eye image components can be output so as to have mutually different polarization directions.

Consequently, the three-dimensional display system including the liquid crystal optical element according to the preferred embodiment of the present invention can present a 3D image with a relatively simple structure. In addition, since the smectic liquid crystal layer has a fast response characteristic, the display system can conduct a display operation accurately enough even if image signals representing the left-eye and right-eye image components are alternately supplied thereto at a high frequency.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 2A, 2B and 2C are perspective views schematically illustrating the liquid crystal layer of the LCD 100, wherein:

FIG. 2A illustrates a state of the liquid crystal layer to which a positive voltage is being applied;

FIG. 2B illustrates a state of the liquid crystal layer to which no voltage (or a voltage lower than the threshold voltage) is being applied; and FIG. 2C illustrates a state of the liquid crystal layer to which a negative voltage is being applied.

FIG. 5 shows the structural formulae of liquid crystal compositions for use in a first specific example of preferred embodiments of the present invention.

FIGS. 7A, 7B and 7C show the polarities of voltages to be applied to the picture element regions of a three-dimensional display system according to a second specific example of preferred embodiments of the present invention, wherein:

FIG. 7A shows the voltages to be applied to the device being driven by a line inversion drive technique;

FIG. 7B shows the voltages to be applied to the device being driven by a field inversion drive technique; and FIG. 7C shows the voltages to be applied to the device being driven by a dot inversion drive technique.

DETAILED DESCRIPTION OF PREFERRED EMBODIMENTS

Hereinafter, preferred embodiments of the present invention will be described with reference to the accompanying drawings. In the following illustrative preferred embodiments, the present invention will be described as being applied to an LCD that presents characters, graphics and so on. However, the present invention is in no way limited to those specific preferred embodiments but may be broadly applicable for use in any other liquid crystal optical element such as an optical shutter for adjusting the quantity of incoming light to be transmitted.

Figure 1:
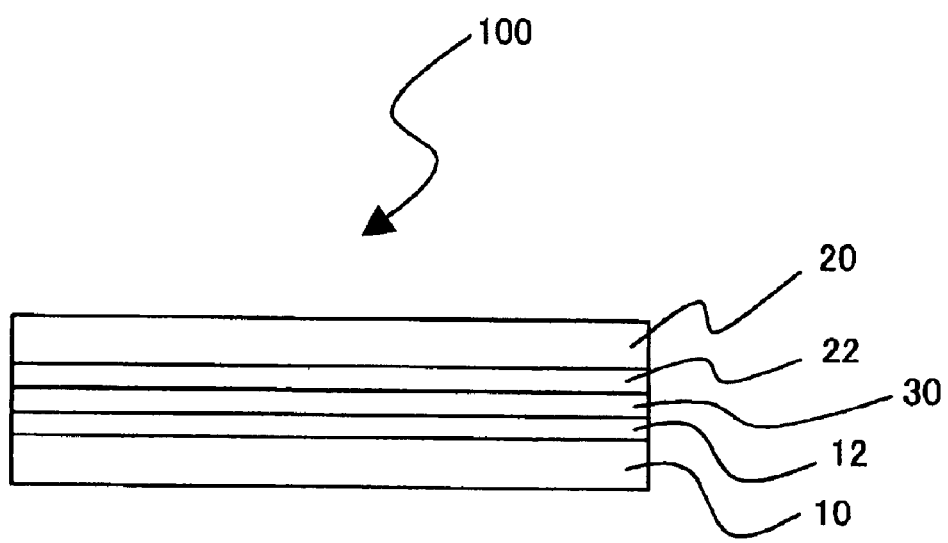
FIG. 1 is a cross-sectional view schematically illustrating an LCD 100 as a liquid crystal optical element according to a preferred embodiment of the present invention.
Figure 2A:
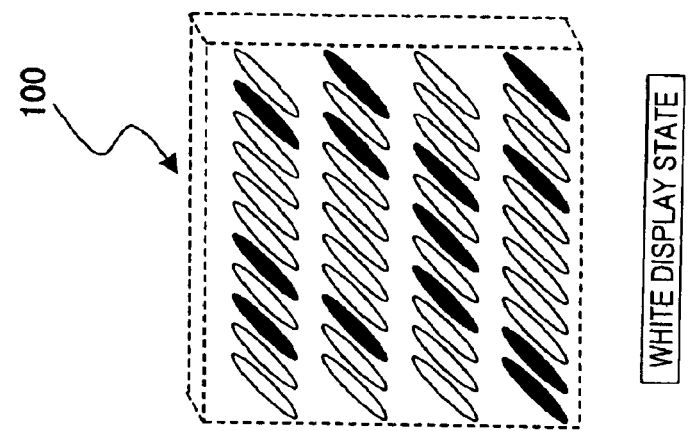
Figure 2B:
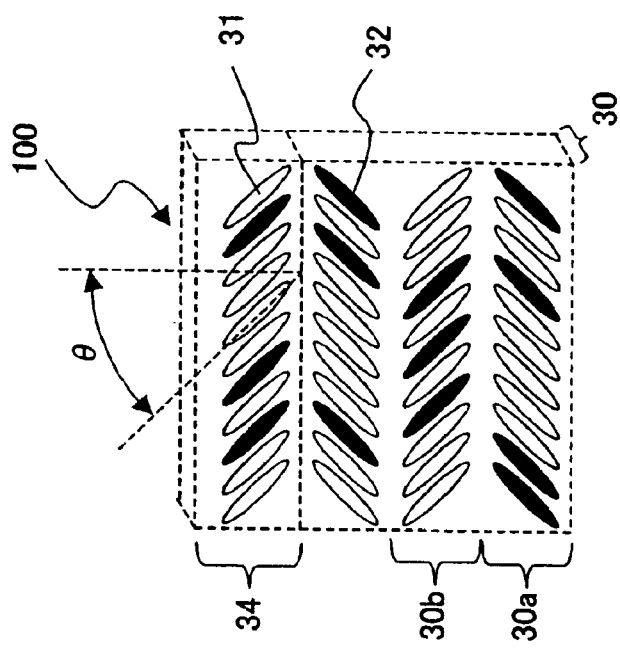
Figure 2C:
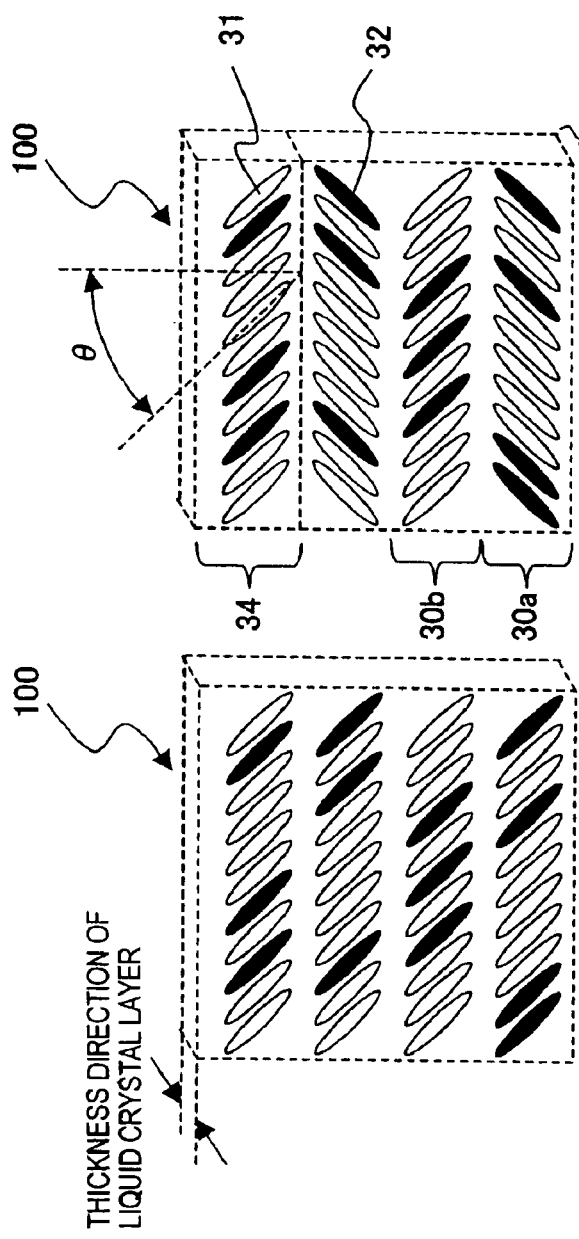

First, the structure of an LCD 100 as an exemplary liquid crystal optical element according to a preferred embodiment of the present invention will be described with reference to FIGS. 1, 2A, 2B and 2C. FIG. 1 is a cross-sectional view schematically illustrating the LCD 100. FIGS. 2A, 2B and 2C are perspective views schematically illustrating the liquid crystal layer of the LCD 100. Specifically, FIG. 2A illustrates a state of the liquid crystal layer to which a positive voltage is being applied. FIG. 2B illustrates a state of the liquid crystal layer to which no voltage (or a voltage lower than the threshold voltage) is being applied. FIG. 2C illustrates a state of the liquid crystal layer to which a negative voltage is being applied.

As shown in FIG. 1, the LCD 100 preferably includes two substrates (of glass, for example) 10 and 20 and a liquid crystal layer 30, which is provided between the substrates 10 and 20. Electrodes 12 and 22 are preferably provided on the inside surfaces of the substrates 10 and 20 so as to face each other with the liquid crystal layer 30 interposed between them. The LCD 100 includes a plurality of unit regions, each of which is defined by the two opposed electrodes 12 and 22. As used herein, the "unit region" refers to the smallest portion of a liquid crystal optical element in which the quantity of outgoing light of the liquid crystal layer 30 is controllable independently. In this LCD 100, the "unit region" is a "picture element region" that is defined for each "picture element" as the smallest display unit. The "picture element region" is used to conduct a display operation in response to an image signal supplied thereto. In an active-matrix-addressed LCD, the picture element region is defined by a picture element electrode and its associated counter electrode. In a simple-matrix-addressed LCD on the other hand, the picture element region is defined by an intersection between a striped column electrode (or signal electrode) and a striped row electrode (or scanning electrode).

As shown in FIGS. 2A, 2B and 2C, the liquid crystal layer 30 preferably includes liquid crystal molecules 31 and dichroic dye molecules 32. The dichroic dye molecules 32 are preferably oriented substantially parallel to the liquid crystal molecules 31 and preferably absorb light that oscillates in a particular direction with respect to the major axis thereof. In this preferred embodiment, the dichroic dye molecules 32 preferably absorb a polarized light ray, of which the plane of polarization is parallel to the major axis thereof, i.e., preferably have an absorption axis parallel to the major axis thereof. It is naturally possible to use dichroic dye molecules of which the absorption axis is not parallel to (but perpendicular to, for example) the major axis thereof. Also, two alignment layers (not shown) are typically provided on the inside surfaces of the electrodes 12 and 22 so as to face each other. The alignment layers may be horizontal alignment layers, for example.

In each picture element region, the liquid crystal layer 30 includes a first liquid crystal region 30a and a second liquid crystal region 30b as shown in FIG. 2B. The orientation directions of each pair of liquid crystal molecules 31 in the first and second liquid crystal regions 30a and 30b (as defined on a plane that is parallel to the principal surfaces of the substrates) preferably have azimuthal directions that define an angle of approximately 90 degrees while no voltage is being applied between the electrodes 12 and 22.

In this preferred embodiment, the liquid crystal layer 30 is preferably a smectic liquid crystal layer exhibiting an antiferroelectric phase. As shown in FIGS. 2A through 2C, the smectic liquid crystal layer 30 preferably has a layered structure. In the smectic liquid crystal layer with such a layered structure, multiple smectic layers 34 are preferably stacked one upon the other in a direction that is defined parallel to the principal surfaces of the substrates (i.e., perpendicularly to the thickness direction of the liquid crystal layer 30). The liquid crystal molecules 31 preferably define a tilt angle (which is also called a "cone angle") θ of about 45 degrees with respect to a normal that is defined perpendicularly to the smectic layers 34. The smectic layers 34 in which the liquid crystal molecules 31 have rotated approximately 45 degrees clockwise from the normal to the smectic layers 34 are the first liquid crystal regions 30a. On the other hand, the smectic layers 34 in which the liquid crystal molecules 31 have rotated approximately 45 degrees counterclockwise from the normal to the smectic layers 34 are the second liquid crystal regions 30b.

In the smectic liquid crystal layer 30 exhibiting the antiferroelectric phase, when the liquid crystal molecules 31 in one of the smectic layers 34 tilt toward a direction from the normal to the smectic layers 34, the liquid crystal molecules 31 in its adjacent smectic layers 34 tilt toward the opposite direction from the normal so as to cancel their polarizations with each other. Thus, in this preferred embodiment, a plurality of smectic layers 34, in which the liquid crystal molecules 31 have rotated clockwise from the normal to the smectic layers 34, and a plurality of smectic layers 34, in which the liquid crystal molecules 31 have rotated counterclockwise from the normal to the smectic layers 34, are stacked alternately along the normal to the smectic layers 34. Accordingly, the first and second liquid crystal regions 30a and 30b are alternately arranged in a direction that is defined parallel to the principal surfaces of the substrates.

The first and second liquid crystal regions 30a and 30b are preferably present within a range, which is approximately half or less as long as (preferably about 200 nm or less) the wavelength of visible radiation (typically in the range of about 400 nm to about 700 nm) as measured in a direction that is parallel to the principal surfaces of the substrates 10 and 20 (e.g., along the normal to the smectic layers 34). In other words, the liquid crystal layer 30 of the LCD 100 preferably includes both of the first and second liquid crystal regions 30a and 30b within this range. Each of the smectic layers 34 typically has a thickness of about 4 nm. Thus, approximately 50 smectic layers 34 should be stacked within this range. In that case, approximately twenty-five striped first liquid crystal regions 30a and approximately twenty-five striped second liquid crystal regions 30b should be alternately arranged within that range.

As described above, in the LCD 100 of this preferred embodiment of the present invention, while no voltage is being applied to the liquid crystal layer 30, the first and second liquid crystal regions 30a and 30b preferably coexist within the range that is approximately half or less as long as the wavelength of visible radiation as measured in a direction that is parallel to the principal surfaces of the substrates. Accordingly, every light ray that has entered the liquid crystal layer 30 always passes both of the first and second liquid crystal regions 30a and 30b, not one of them. This is because a light ray having a wavelength $\lambda$ never has a resolution lower than $\lambda/2$ due to the diffraction phenomenon of light. This is also understandable from the fact that an optical microscope has a resolution of $\lambda/2$. For that reason, whenever the first and second liquid crystal regions 30a and 30b coexist within the range that is approximately half or less as long as the wavelength of visible radiation, the incoming light ray never fails to pass these two regions. In the first and second liquid crystal regions 30a and 30b, the orientation directions of each pair of liquid crystal molecules 31 have azimuthal directions that define an angle of approximately 90 degrees. Thus, each pair of dichroic dye molecules 32 also has absorption axes that cross each other substantially at right angles. Accordingly, while passing through both of the first and second liquid crystal regions 30a and 30b, the incoming light ray should be absorbed into the dichroic dye molecules 32 in the first liquid crystal region 30a and/or the dichroic dye molecules 32 in the second liquid crystal region 30b. As a result, almost no light is transmitted through the liquid crystal layer 30. In this manner, the LCD 100 realizes a black display state while no voltage is being applied thereto.

Also, when a voltage that is equal to or higher than a predetermined threshold voltage is applied to the smectic liquid crystal layer 30 exhibiting the antiferroelectric phase, a phase transition occurs from the antiferroelectric phase into a ferroelectric phase as shown in FIGS. 2A and 2B. In the ferroelectric phase, the liquid crystal molecules 31 tilt toward a single direction from the normal to the smectic layers 34. Accordingly, the absorption axes of the dichroic dye molecules 32 also tilt toward the same direction within each picture element region. Thus, in this state in which a voltage equal to or higher than the predetermined threshold voltage is applied, a polarized light ray, of which the plane of polarization crosses the absorption axis at right angles, goes out of the liquid crystal layer 30, thus realizing a white display state. It should be noted that in the ferroelectric phase, the liquid crystal molecules 31 reverse their tilt direction according to the polarity of the applied voltage as shown in FIGS. 2A and 2C. Accordingly, the polarization direction of the light ray that has gone out of the liquid crystal layer 30 in the white display state to which a positive voltage is being applied is different from that of the light ray that has gone out of the liquid crystal layer 30 in the white display state to which a negative voltage is being applied. Typically, these two polarization directions are perpendicular to each other.

As described above, the LCD 100 of this preferred embodiment of the present invention can conduct a display operation without using any polarizer, thus cutting down the manufacturing cost and minimizing the unwanted decrease in yield due to possible mixture of foreign matter during the process step of bonding the polarizers. In addition, the LCD 100 of this preferred embodiment of the present invention does not need two liquid crystal cells, thus avoiding the increase in manufacturing cost due to the use of the additional liquid crystal cell. This is why the LCD 100 of this preferred embodiment of the present invention ensures high productivity.

Furthermore, the LCD 100 according to this preferred embodiment of the present invention can conduct a display operation with a single liquid crystal layer. Thus, there is no need to stack two liquid crystal layers one upon the other or to transform those layers into films. Accordingly, the decrease in response speed that should be caused by the filmed liquid crystal layers is avoidable. Consequently, the LCD 100 of this preferred embodiment of the present invention exhibits excellent performance.

In addition, the smectic liquid crystal layer has a fast response characteristic. Accordingly, by using a smectic liquid crystal layer as the liquid crystal layer 30 as is done in this preferred embodiment, an LCD with a high response speed can be obtained.

In the example illustrated in FIGS. 2A through 2C, the liquid crystal molecules 31 define a tilt angle $\theta$ of about 45 degrees with respect to the normal to the smectic layers 34. However, the tilt angle $\theta$ does not have to be exactly equal to 45 degrees but may be around 45 degrees to get a display operation done sufficiently effectively.

Figure 3:
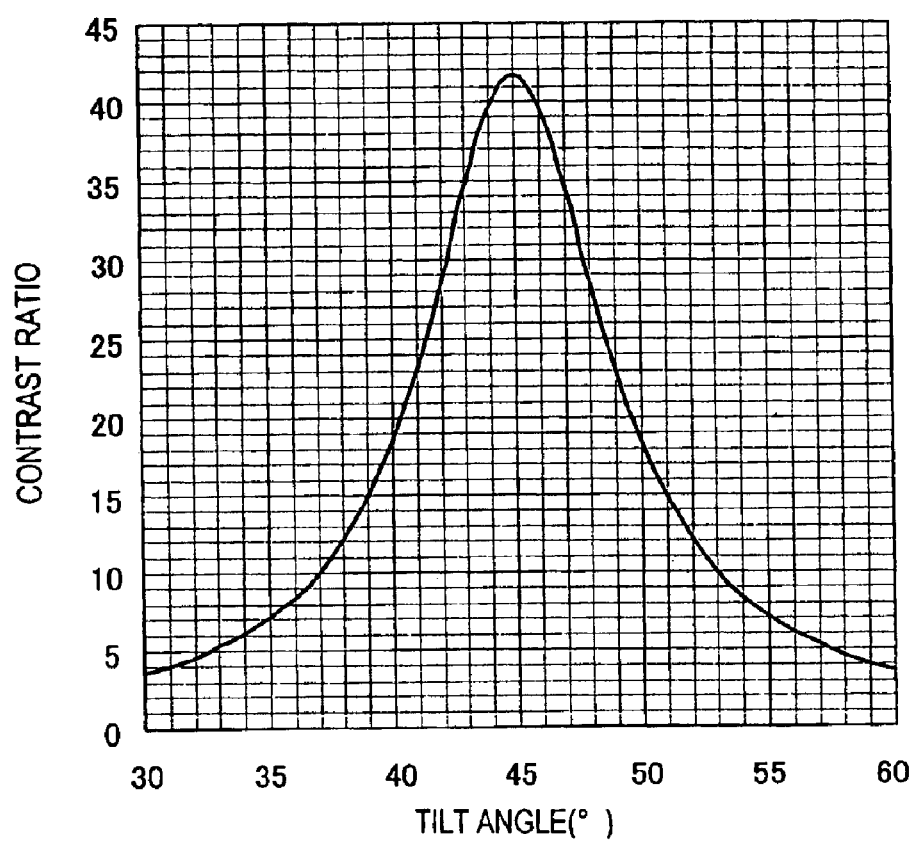
FIG. 3 is a graph showing a relationship between the tilt angle that is defined by liquid crystal molecules with respect to a normal to smectic layers and the contrast ratio (i.e., the ratio of transmittance in white display state to transmittance in black display state).

FIG. 3 shows a relationship between the tilt angle $\theta$ of the liquid crystal molecules 31 and the contrast ratio (i.e., the ratio of the transmittance in the white display state to that in the black display state).

As can be seen from FIG. 3, if the liquid crystal molecules 31 have a tilt angle $\theta$ of about 45 degrees, then a (local) maximum contrast ratio is achieved so that a display operation can be conducted very efficiently.

On the other hand, if the liquid crystal molecules 31 have a tilt angle $\theta$ of about 43.5 degrees to about 46.5 degrees, then the resultant contrast ratio will be at most 10% lower than the maximum contrast ratio for the tilt angle of about 45 degrees and a display operation can also be conducted in a sufficiently good condition.

Furthermore, if the liquid crystal molecules 31 have a tilt angle θ of about 40.3 degrees to about 49.7 degrees, then a contrast ratio of at least about 20 is achieved and a display operation can be conducted with almost no problems caused in practice.

Furthermore, if the liquid crystal molecules 31 have a tilt angle θ of about 37.0 degrees to about 53.0 degrees, then a contrast ratio of at least about 10, which is almost equal to that of reflective LCDs for use in currently available PDAS, for example, is achieved. Accordingly, a display operation can also be conducted effectively enough where the main application is inputting and outputting character information.

Furthermore, if the liquid crystal molecules 31 have a tilt angle θ of about 32.7 degrees to about 57.4 degrees, then a contrast ratio of at least about 5, which is almost equal to that of newspapers and other normal prints, is achieved. Accordingly, a display operation can also be conducted effectively enough where the main application is presenting monochrome character information sources.

As described above, the closer to 45 degrees the tilt angle θ of the liquid crystal molecules 31, the higher the resultant contrast ratio. Meanwhile, the response characteristic improves as the tilt angle θ decreases. Thus, to improve the quality of moving pictures being displayed, the tilt angle θ is preferably as small as possible. In sum, the tilt angle θ is preferably defined within the range of around 45 degrees according to the desired combination of contrast ratio and response characteristic.

Figure 4A:
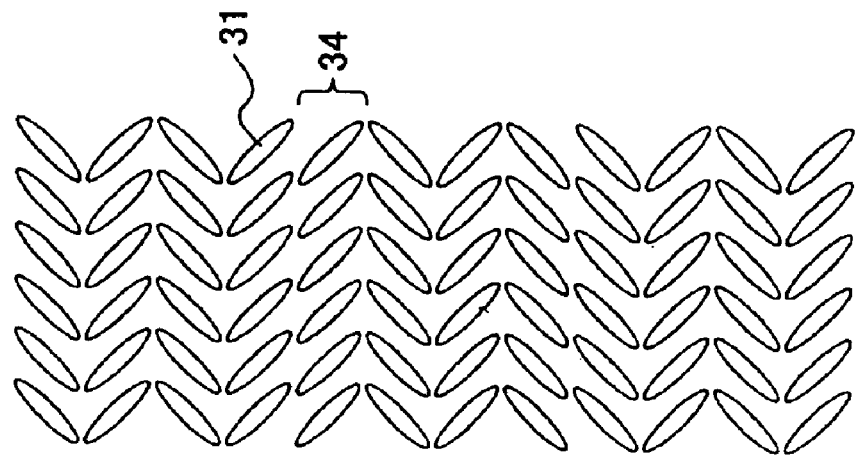
FIG. 4A schematically illustrates the orientation state of liquid crystal molecules in an antiferroelectric phase.

In the preferred embodiment described above, a smectic liquid crystal layer 30 exhibiting an antiferroelectric phase is used. Alternatively, a smectic liquid crystal layer 30 exhibiting a ferrielectric phase may also be used. A phase in which the liquid crystal molecules 31 tilt toward a single direction from the normal to the smectic layers 34 as shown in FIGS. 2A and 2C is called a "ferroelectric phase". A phase in which the liquid crystal molecules 31 reverse their tilt directions on a layer-by-layer basis as shown in FIGS. 2B and 4A is called an "antiferroelectric phase". And a phase in which the liquid crystal molecules 31 tilt in any of the other ways as shown in FIGS. 4B and 4C is called a "ferrielectric phase".

Figure 4B:
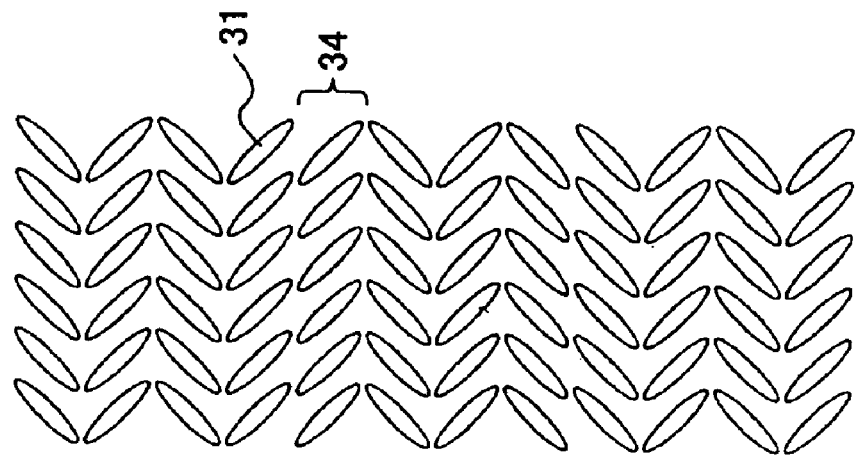
FIGS. 4B and 4C schematically illustrate the orientation states of liquid crystal molecules in a ferrielectric phase.
Figure 4C:
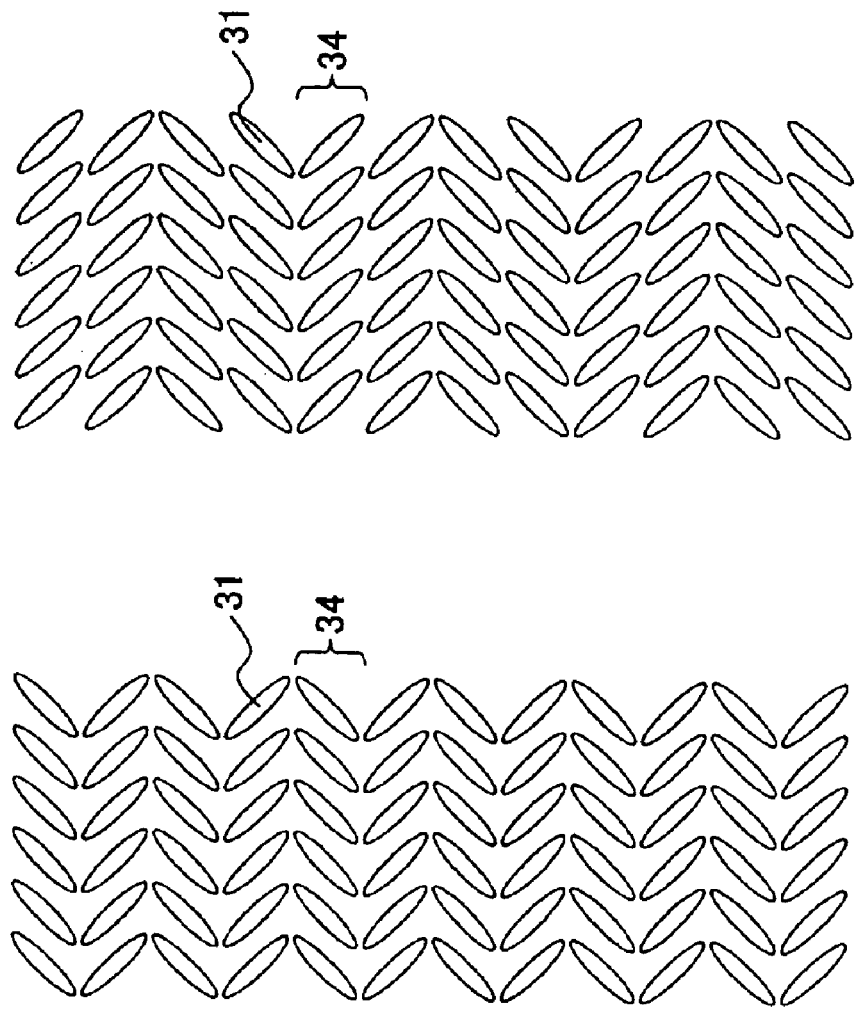

In the ferrielectric phase, liquid crystal molecules 31 tilting toward one direction from the normal to the smectic layers 34 and liquid crystal molecules 31 tilting toward the opposite direction from the normal to the smectic layers 34 coexist as shown in FIGS. 4B and 4C. Thus, an orientation state, including the first and second liquid crystal regions, where the orientation directions of each pair of liquid crystal molecules 31 have azimuthal directions that define an angle of approximately 90 degrees, within a range that is approximately half or less as long as the wavelength of visible radiation, is achieved. As a result, a black display state is realized by utilizing such a state. To realize an even darker black display state by absorbing light more efficiently, the number (or the probability) of liquid crystal molecules 31 tilting toward one direction is preferably approximately equal to that of liquid crystal molecules 31 tilting toward the opposite direction in the range that is approximately half or less as long as the wavelength of visible radiation. Also, when a voltage equal to or higher than the threshold voltage is applied to a liquid crystal layer exhibiting the ferrielectric phase, the ferrielectric phase switches into a ferroelectric phase in which the liquid crystal molecules 31 tilt toward the same direction from the normal to the smectic layers. Thus, a white display state is realized by utilizing this state with the ferroelectric phase.

Alternatively, a smectic liquid crystal layer, exhibiting neither the antiferroelectric phase nor the ferrielectric phase but a V-shaped switching characteristic, may also be used. The smectic liquid crystal layer with the V-shaped switching characteristic shows a symmetric increase in transmittance in response to positive and negative voltages applied thereto (see, for example, A. Fukuda, "Pre-transitional Effect in AF-F Switching: To Suppress It or to Enhance It, That Is My Question about AFLCDs", Proc. 15$^{th}$ Display Conf., Asia Display '95, S6-1, p. 61). While no voltage is being applied to such a smectic liquid crystal layer, the number (or the probability) of liquid crystal molecules tilting toward one direction from the normal to the smectic layers would be approximately equal to that of liquid crystal molecules tilting toward the opposite direction. Thus, a black display state is realized by utilizing such a state. Also, when a voltage is applied thereto, a phase transition into the ferroelectric phase also occurs. Thus, a white display state is realized by utilizing this state with the ferroelectric phase.

In the preferred embodiment described above, a smectic liquid crystal layer, in which the first and second liquid crystal regions 30a and 30b are defined by themselves, is used as the liquid crystal layer 30. However, the present invention is in no way limited to such a specific preferred embodiment. Optionally, the liquid crystal layer including the first and second liquid crystal regions may also be obtained by providing a first orientation control area and a second orientation control area on the respective inside surfaces of the substrates. In this case, the first orientation control area is preferably provided so as to get the liquid crystal molecules oriented in an azimuthal direction (which will be referred to herein as a "first azimuthal direction" for convenience sake), while the second orientation control area is preferably provided so as to get the liquid crystal molecules oriented in a second azimuthal direction, which defines an angle of about 90 degrees with the first azimuthal direction. Those first and second orientation control areas may be defined by a fine alignment treatment technique such as a photoalignment method. However, to make the liquid crystal optical element easily, the first and second liquid crystal regions are preferably defined by themselves as in the smectic liquid crystal layer described above.

In the preferred embodiment described above, the present invention is applied to a transmissive LCD. However, the present invention is in no way limited to such a specific preferred embodiment but is also effectively applicable for use in a reflective LCD.

An LCD (i.e., an exemplary liquid crystal optical element) 100 according to a preferred embodiment of the present invention is preferably used in a three-dimensional display system. Particularly when the LCD 100 includes a smectic liquid crystal layer exhibiting an antiferroelectric phase, a smectic liquid crystal layer exhibiting a ferrielectric phase or a smectic liquid crystal layer with a V-shaped switching characteristic as the liquid crystal layer 30, the LCD 100 can be used effectively in a three-dimensional display system.

A three-dimensional display system emits a light beam representing a left-eye image component (i.e., an image component to be viewed with the left eye) and a light beam representing a right-eye image component (i.e., an image component to be viewed with the right eye) as light beams with mutually different polarization directions toward a viewer who wears 3D glasses including polarizers with mutually different polarization axes on the right and left eyes. As a result, these light beams representing the left-eye and right-eye image components are selectively incident onto the viewer's left and right eyes, respectively, thereby presenting a 3D image thereon.

When a voltage that is equal to or higher than the threshold voltage is applied to the smectic liquid crystal layer exhibiting the antiferroelectric phase, the smectic liquid crystal layer exhibiting the ferrielectric phase or the smectic liquid crystal layer with the V-shaped switching characteristic, a phase transition into the ferroelectric phase, in which the liquid crystal molecules 31 tilt toward a single direction from a normal that is defined perpendicularly to the smectic layers 34, is induced by the applied voltage as shown in FIGS. 2A and 2C. The tilt direction reverses according to the polarity of the applied voltage (i.e., whether the applied voltage is positive or negative). Accordingly, the outgoing light ray of the liquid crystal layer 30 to which a positive voltage is being applied and the outgoing light ray of the liquid crystal layer 30 to which a negative voltage is being applied have mutually different polarization directions.

Thus, if an image signal representing the left-eye image component and an image signal representing the right-eye image component are alternately supplied to each picture element region and if the polarity of the voltage applied between the electrodes is inverted when the image signal representing the right-eye image component is supplied to each picture element region after the image signal representing the left-eye image component has been supplied thereto, then two light beams corresponding to the left-eye and right-eye image components can be output so as to have mutually different polarization directions. In addition, since the smectic liquid crystal layer has a fast response characteristic, the display system can conduct a display operation accurately enough even if those image signals representing the left-eye and right-eye image components are alternately supplied thereto at a high frequency.

According to a conventional method of outputting the light beams representing the left-eye and right-eye image components with mutually different polarization directions, two regions, of which the absorption axes cross each other substantially at right angles, are provided for the polarizers of a liquid crystal cell. However, it is very difficult to make such polarizers. In another conventional method, a device of electrically controlling and switching the polarization directions of the light beam to be emitted toward the viewer is provided in front of a display system. But with such a device provided, the structure of the overall display system gets overly complicated and the manufacturing cost thereof increases unintentionally.

In contrast, the three-dimensional display system including the LCD 100 according to the preferred embodiment of the present invention can present a 3D image with a relatively simple structure as described above.

EXAMPLES

Hereinafter, specific examples of preferred embodiments of the present invention will be described. It should be noted that the present invention is in no way limited to the following illustrative examples.

Example 1

An LCD 100 having the structure shown in FIGS. 1, 2A, 2B and 2C was fabricated as a first specific example.

In this LCD 100, the substrates 10 and 20 thereof were made of glass and the electrodes 12 and 22 thereof were made of ITO, which is a transparent conductive material. Alignment layers of polyimide were used and subjected to a rubbing treatment with a piece of soft cloth.

The substrates 10 and 20, on which the electrodes 12 and 22 and alignment layers were stacked in this order, were bonded together with a gap of about 1.5 $\mu$m provided between them. This gap was controlled by dispersing columnar spacers with a thickness of about 1.5 $\mu$m on the surface of the substrate 10 or 20. Those spacers were obtained by patterning a photoresist film to planar sizes of about 10 $\mu$m square.

Next, a smectic liquid crystal layer 30 exhibiting an antiferroelectric phase was made of the liquid crystal material disclosed in Ferroelectrics, Vol. 244, pp. 115–128. FIG. 5 shows the structural formulae of that liquid crystal composition. In the smectic liquid crystal layer 30 made of this liquid crystal material, each pair of liquid crystal molecules 31 in two adjacent smectic layers 34 tilts toward mutually opposite directions and defines a tilt angle of about 45 degrees with respect to the normal to the smectic layers 34 as shown in FIG. 2B. A dichroic dye on the market was added to the liquid crystal material, and then the mixture was injected into the gap between the substrates 10 and 20 and the injection hole was sealed, thereby obtaining the liquid crystal layer 30.

Figure 6:
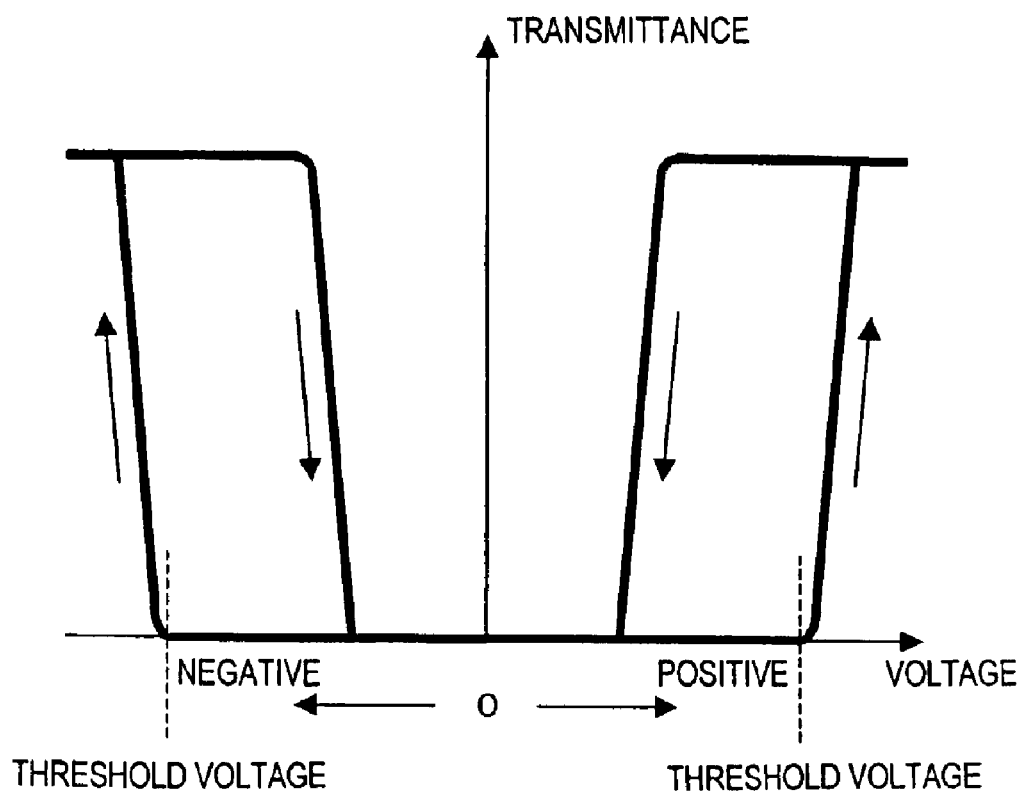
FIG. 6 is a graph showing the voltage-transmittance characteristic of an LCD according to the first specific example.
Figure 8:
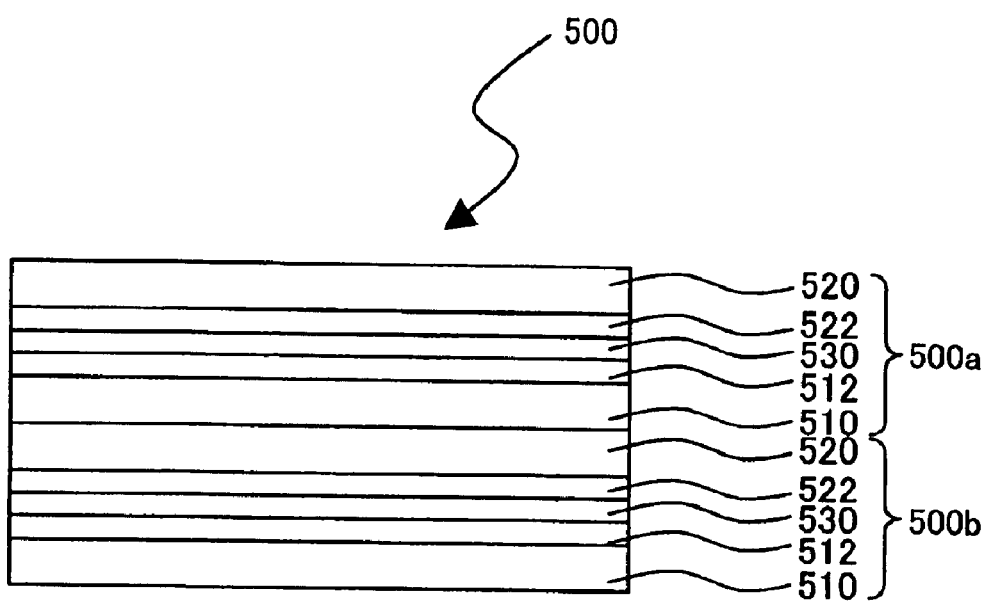
FIG. 8 is a cross-sectional view schematically illustrating a conventional liquid crystal optical element 500.
Figure 9:
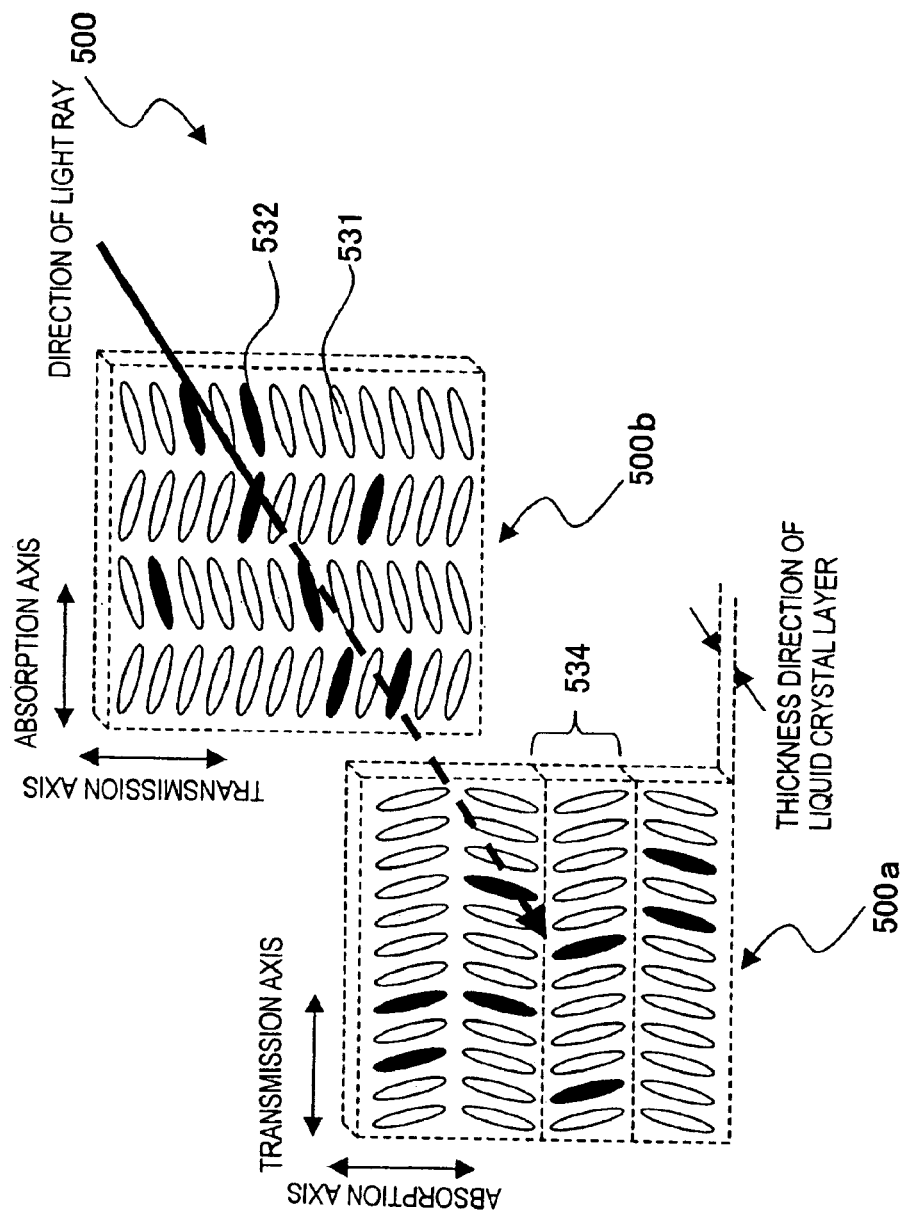
FIG. 9 is a perspective view schematically illustrating the liquid crystal layers of the conventional liquid crystal optical element 500.

FIG. 6 shows the voltage-transmittance characteristic of the LCD of this specific example that was fabricated in this manner. As shown in FIG. 6, the LCD of this specific example exhibits a black display state when the applied voltage is equal to or lower than the threshold voltage but exhibits a white display state once the applied voltage exceeds the threshold voltage.

The contrast ratio in the frontal direction was 40 or more. Thus, the present inventors confirmed that a display operation could be conducted effectively enough with just a single liquid crystal cell and without using any polarizer.

Example 2

Figures 7A, 7B, 7C:
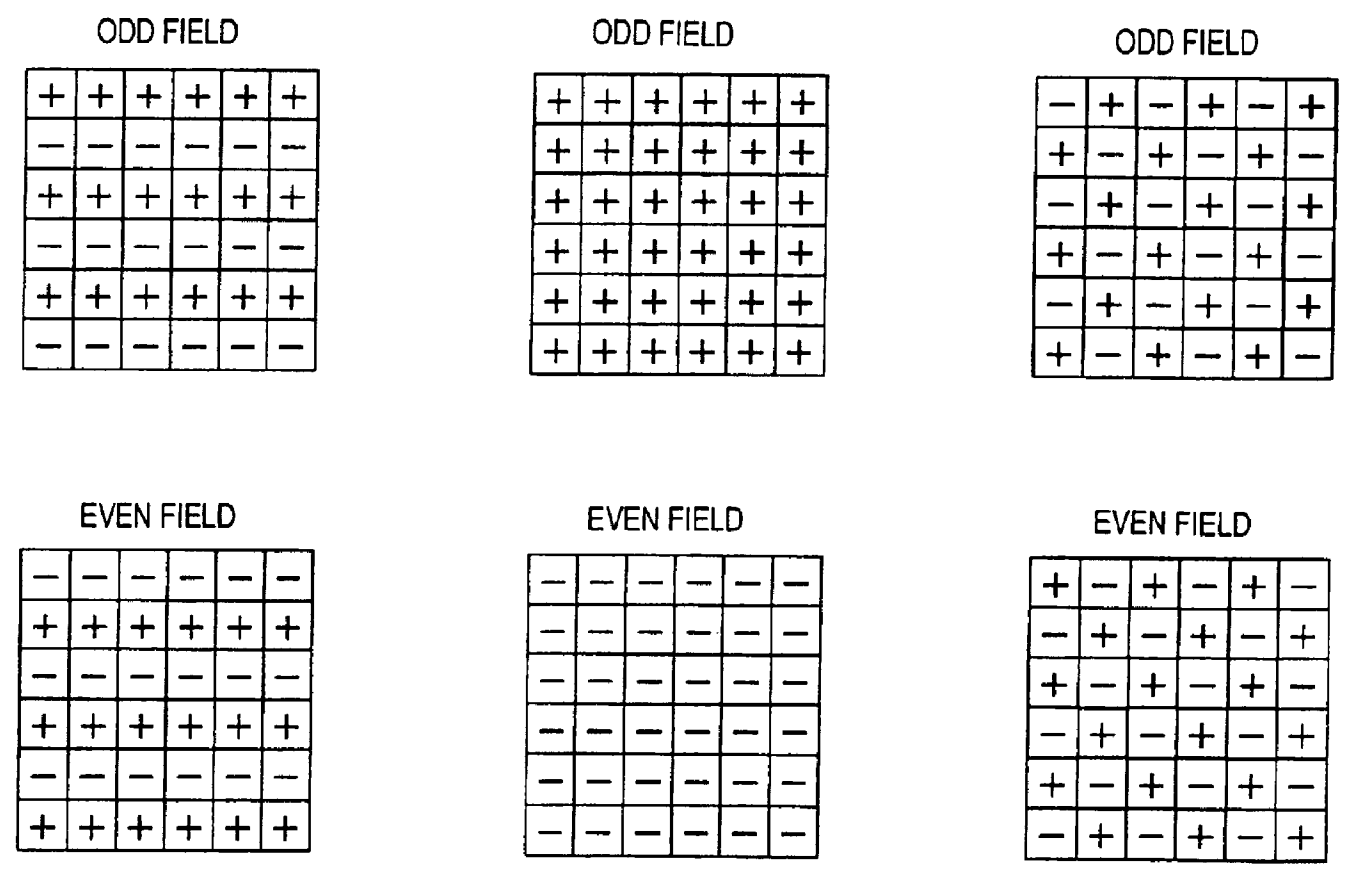

A three-dimensional display system including the LCD of the first specific example was fabricated as a second specific example. This display system was driven by a simple-matrix addressing technique. The applied voltage had a waveform as described in SID 95 Digest, pp. 789–792. And this display system was driven by a line inversion drive technique such that the polarity of the applied voltage was inverted every line and that the polarities of the applied voltages for an odd-numbered field were opposite to those of the applied voltages for an even-numbered field as shown in FIG. 7A.

The image signals to be supplied to each picture element region were prepared in advance for 3D display purposes. Specifically, when a positive voltage was applied, a left-eye image component was displayed. On the other hand, when a negative voltage was applied, a right-eye image component was displayed.

The viewer wore a pair of 3D glasses with polarizers. In this pair of 3D glasses, the left-eye glass thereof was provided with a polarizer, of which the absorption axis was parallel to the major axis of liquid crystal molecules to which a positive voltage was being applied, and the right-eye glass thereof was provided with a polarizer, of which the absorption axis was parallel to the major axis of liquid crystal molecules to which a negative voltage was being applied. By wearing such 3D glasses, the viewer could see only the left-eye image component for the positive applied voltage with his or her left eye and only the right-eye image component for the negative applied voltage with his or her right eye, respectively. Thus, the viewer could sense a 3D image.

The left-eye and right-eye image components were alternately presented in each picture element region. Accordingly, the resolution never decreased due to the three-dimensional display.

In this specific example, the line inversion drive technique is adopted. Alternatively, the field inversion drive technique as shown in FIG. 7B or the dot inversion drive technique as shown in FIG. 7C may also be used. However, to achieve excellent display quality with the flicker minimized, the line inversion drive shown in FIG. 7A is preferred to the field inversion drive shown in FIG. 7B and the dot inversion drive shown in FIG. 7C is even more preferable to the line inversion drive shown in FIG. 7A.

According to various preferred embodiments of the present invention described above, a display operation can be conducted with a single liquid crystal layer and without any polarizer, thus providing a liquid crystal optical element that achieves high productivity and excellent performance without using any polarizer. Also, a liquid crystal optical element according to a preferred embodiment of the present invention can be used effectively in a three-dimensional display system. Thus, a three-dimensional display system, which can present a 3D image with a relatively simple structure, is provided.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A liquid crystal optical element comprising:
    two substrates;
    a liquid crystal layer, which is provided between the two substrates and which includes liquid crystal molecules and dichroic dye molecules; and
    at least two electrodes, which are provided on the two substrates, respectively, so as to face each other with the liquid crystal layer interposed between them and which define one of a plurality of unit regions,
    wherein in each of the unit regions, the liquid crystal layer includes a first liquid crystal region and a second liquid crystal region within a range, which is approximately half or less as long as the wavelength of visible radiation as measured in a direction that is parallel to the surfaces of the two substrates, the orientation directions of each pair of liquid crystal molecules in the first and second liquid crystal regions having azimuthal directions that define an angle of approximately 90 degrees while no voltage is being applied between the electrodes.

2. The liquid crystal optical element of claim 1, wherein the liquid crystal layer is a smectic liquid crystal layer including a plurality of smectic layers, and
    wherein the liquid crystal molecules define a tilt angle of about 45 degrees with respect to a normal that is defined perpendicularly to the smectic layers.

3. The liquid crystal optical element of claim 2, wherein the smectic liquid crystal layer exhibits an antiferroelectric phase.

4. The liquid crystal optical element of claim 2, wherein the smectic liquid crystal layer exhibits a ferrielectric phase.

5. The liquid crystal optical element of claim 4, wherein while no voltage is being applied between the electrodes, the number of liquid crystal molecules tilting toward one direction from the normal that is defined perpendicularly to the smectic layers is approximately equal to that of liquid crystal molecules tilting toward the opposite direction from the normal.

6. The liquid crystal optical element of claim 2, wherein the smectic liquid crystal layer has a V-shaped switching characteristic.

7. The liquid crystal optical element of claim 2, wherein the liquid crystal molecules of the smectic liquid crystal layer have a tilt angle of about 43.5 degrees to about 46.5 degrees.

8. The liquid crystal optical element of claim 2, wherein the liquid crystal molecules of the smectic liquid crystal layer have a tilt angle of about 40.3 degrees to about 49.7 degrees.

9. The liquid crystal optical element of claim 2, wherein the liquid crystal molecules of the smectic liquid crystal layer have a tilt angle of about 37.0 degrees to about 53.0 degrees.

10. The liquid crystal optical element of claim 2, wherein the liquid crystal molecules of the smectic liquid crystal layer have a tilt angle of about 32.7 degrees to about 57.4 degrees.

11. A three-dimensional display system including the liquid crystal optical element of claim 1,
    wherein the unit regions of the liquid crystal optical element are a plurality of picture element regions that are used to conduct a display operation in response to an image signal supplied, and
    wherein the three-dimensional display system alternately displays a left-eye image component and a right-eye image component on each of the picture element regions, thereby presenting a three-dimensional image thereon, and
    wherein a voltage applied between the electrodes in supplying an image signal representing the left-eye image component to each of the picture element regions and a voltage applied between the electrodes in supplying an image signal representing the right-eye image component to the picture element region have mutually opposite polarities.

12. The three-dimensional display system of claim 11, wherein the liquid crystal layer of the liquid crystal optical element is a smectic liquid crystal layer including a plurality of smectic layers, and
    wherein the liquid crystal molecules define a tilt angle of about 45 degree with respect to a normal that is defined perpendicularly to the smectic layers.

13. The three-dimensional display system of claim 12, wherein the smectic liquid crystal layer exhibits an antiferroelectric phase.

14. The three-dimensional display system of claim 12, wherein the smectic liquid crystal layer exhibits a ferrielectric phase.

15. The three-dimensional display system of claim 14, wherein while no voltage is being applied between the electrodes, the number of liquid crystal molecules tilting toward one direction from the normal that is defined perpendicularly to the smectic layers is approximately equal to that of liquid crystal molecules tilting toward the opposite direction from the normal.

16. The three-dimensional display system of claim 12, wherein the smectic liquid crystal layer has a V-shaped switching characteristic.

* * * * *